United States Patent
Yli-Koski

(10) Patent No.: US 8,352,087 B2
(45) Date of Patent: Jan. 8, 2013

(54) CONTROL METHOD AND CONTROL SYSTEM FOR A FLOW CONTROL VALVE

(75) Inventor: Esko Yli-Koski, Kerava (FI)

(73) Assignee: Metso Automation Oy, Helsinki (FI)

( * ) Notice: Subject to any disclaimer, the term of this patent is extended or adjusted under 35 U.S.C. 154(b) by 969 days.

(21) Appl. No.: 12/084,561

(22) PCT Filed: Jun. 5, 2007

(86) PCT No.: PCT/FI2007/050325
§ 371 (c)(1),
(2), (4) Date: Jul. 3, 2008

(87) PCT Pub. No.: WO2007/141386
PCT Pub. Date: Dec. 13, 2007

(65) Prior Publication Data
US 2009/0125154 A1    May 14, 2009

(30) Foreign Application Priority Data
Jun. 6, 2006    (FI) ..................... 20065383

(51) Int. Cl.
G05D 7/00    (2006.01)
(52) U.S. Cl. .................... 700/282; 700/13
(58) Field of Classification Search .......... 700/2, 9, 700/14, 275, 282, 11, 13, 56; 73/1.16; 137/8; 702/45, 50
See application file for complete search history.

(56) References Cited

U.S. PATENT DOCUMENTS

| | | | |
|---|---|---|---|
| 4,277,832 A | 7/1981 | Wong | |
| 5,161,100 A | 11/1992 | Whipple | |
| 5,331,995 A | 7/1994 | Westfall et al. | |
| 5,660,198 A | 8/1997 | McClaran | |
| 5,889,205 A | 3/1999 | Treinies et al. | |
| 5,995,909 A | 11/1999 | Bretmersky et al. | |
| 2005/0261842 A1* | 11/2005 | Yamagishi et al. | 702/45 |
| 2005/0273204 A1 | 12/2005 | Hansen et al. | |

FOREIGN PATENT DOCUMENTS

| | | |
|---|---|---|
| EP | 0 540 079 A1 | 5/1993 |
| FI | 53047 | 9/1977 |
| GB | 2 123 983 A | 2/1984 |

* cited by examiner

*Primary Examiner* — Carlos Ortiz Rodriguez
(74) *Attorney, Agent, or Firm* — Oliff & Berridge, PLC

(57) ABSTRACT

A method and system for controlling a flow control valve, comprising measuring a flow at a suitable point of a flow process and calculating a pressure drop across the valve from a $C_v$ curve of the valve, a measured valve opening $\alpha_m$, and the measured flow ($Q_m$). From this calculated pressure drop, a flow set point ($Q_{sp}$), and an inverse $C_v$ curve of the valve, a new valve opening ($\alpha_c$) providing the desired flow is calculated. The control is thus adapted to each operating point and its prevailing flow gain and linearizes the dependence between flow control and flow.

13 Claims, 4 Drawing Sheets

CONTROL METHOD AND CONTROL SYSTEM FOR A FLOW CONTROL VALVE

FIELD OF THE INVENTION

The present invention relates generally to controlling a control valve and particularly to controlling a control valve controlling a liquid or gas flow.

BACKGROUND OF THE INVENTION

A control valve is generally used for a continuous control of a liquid or gas flow in different pipelines and processes. In a processing industry, such as pulp and paper, oil refining, petrochemical and chemical industries, different kinds of control valves installed in a plant's pipe system control material flows in the process. A material flow may contain any fluid material, such as fluids, liquors, liquids, gases and steam. The control valve is usually connected with an actuator, which moves the closing element of the valve to a desired open position between fully open and fully closed positions. The actuator may be a cylinder-piston, for example. The actuator, for its part, is usually controlled by a valve positioner or a valve guide, which controls the position of the closing element of the control valve and thus the material flow in the process according to a control signal from the controller.

Processes are controlled by control loops/circuits. A control loop or circuit consists, for instance, of a process to be controlled, a control valve, a measuring sensor and transmitter, and a controller. The controller gives the control valve a control signal as an analog current signal or a digital control message, for example. The measuring sensor measures a controlled variable, and the measurement product obtained is fed back to the controller, where it is compared with a given reference value. On the basis of the difference variable, the controller calculates the control for the control valve. Usually the controller functions in such a manner that it minimizes the difference variable by a suitable control algorithm, such as a PI or PID algorithm. This control algorithm is typically tuned for each valve during mounting or operation.

A known flow control implemented with a control valve comprises an entity consisting of a control valve, a controller and a flow indicator. A PID or PE type of controller receives a flow set point $Q_{sp}$ and a measured flow $Q_m$. In the PID control algorithm it is assumed that the control valve is linear, i.e. that the flow is linearly dependent on the control signal, which is also referred to as a linear installed characteristic. When the control valve is linear, the controller parameters P, I and D may be fixed values. Flow gain $dQ/d\alpha$ (Q=flow, $\alpha$=valve opening) of the installed control valve must in this case be constant in order for the control valve to operate in a stable manner and with as small an error as possible in the entire flow area to be controlled.

In practice, the characteristic of the control valve installed in the process pipeline is non-linear due to the natural characteristic of the valve, overdimensioning of the valve, pipeline losses and the pump curve. In other words, with different valve openings the flow gain varies considerably in process conditions. In this case, the PID controller gain should always be changed to adapt to each operating point in order to achieve a good flow control. Another problem is that the slope of the installed characteristic does not remain constant at the same operating point of the control valve but changes, for example, when the other control elements connected to the pipeline are performing control operations. For stability reasons, the controller parameters must often be set according to the highest flow gain of the value and the process conditions, and when changes take place, in the region of a lower flow gain the flow to be controlled has error a long time because of the slowness of the control. To alleviate this problem, the flow gain that changes regularly according to the flow may be compensated for by a tabulated gain of the controller. In practice, it is difficult to find tabular values, and they cannot be used for compensating for randomly changing process conditions.

Finnish Patent FI 53047 discloses utilization of a $C_v$ (flow co-efficient) curve of a valve for controlling the control valve. In this known solution, the valve opening and the pressure drop $\Delta p$ across the valve are measured. These are read to a control unit, in which there is stored the $C_v$ curve of the valve as a function of the position of the closure member. By using a known flow equation $$Q=N*C_v*\sqrt{\Delta p/G} \qquad (1)$$

the control unit solves the required $C_v$ value and, by utilizing the $C_v$ curve, the required position of the closure member, when $Q=Q_{sp}$, G=relative density of material flow and N=constant coefficient. Inaccuracies in the $C_v$ curve of the valve, the measurement of the valve opening and the measured pressure drop across the valve appear as a permanent error in the controlled flow. The equations of the patent FI 53047 use the coefficient $k_v$, whose value may be kv=0.857× Cv, for instance. The difference between the coefficient kv and the parameter Cv used herein is the unit used.

SUMMARY OF THE INVENTION

It is an object of the invention to improve flow control performed by a control valve.

The object of the present invention is achieved by a method and a system described in the appended independent claims. Preferred embodiments of the invention are disclosed in the dependent claims.

According to an embodiment of the invention, a flow rate is measured at a suitable location in the flow process and the pressure drop across the valve is calculated by using the $C_v$ curve of the valve, the measured valve opening and the measured flow. On the basis of the calculated pressure drop, the flow set point (i.e. the desired flow) and the inverse $C_v$ curve of the valve, a new valve opening providing the desired flow rate is calculated. The control is thus adapted to each operating point and its prevailing flow gain. In this way, the control algorithm of the invention linearizes the dependence between flow control and the flow rate.

In an embodiment of the invention, an integrating function is applied to the error in the flow and the flow is forced to its set point value. The flow will not have an error exceeding the inaccuracy of the flow indicator, because the control algorithm according to an embodiment of the invention increases a valve opening control signal by integrating the difference between the flow set point and the measured flow until the valve opening changes to a direction reducing the error. Due to the present invention, application-specific gain coefficients need not be determined for the control, like in the PID controller. The $C_v$ curve of the control valve is independent of the process conditions, and it may be stored already when the control valve is assembled. The start-up in the process conditions does not require setting of gain coefficients or changes in the coefficient or tabulation in the changing process conditions.

BRIEF DESCRIPTION OF DRAWINGS

The invention will now be described in greater detail by means of embodiments shown as examples and with reference to the attached drawings, in which.

DETAILED DESCRIPTION

Figure 1:
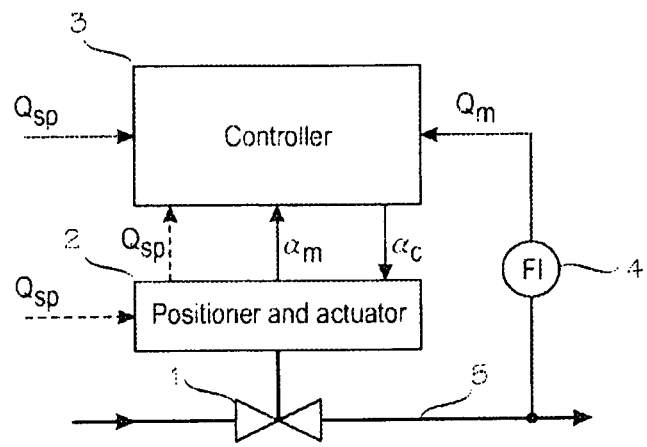
FIG. 1 is a schematic block diagram showing an example of a control circuit according to an embodiment of the invention.

In the example of FIG. 1, a control valve 1 is connected to a process pipeline 5 to control the flow of a substance in the process pipeline 5. The material flow may contain any fluid material, such as fluids, liquors, liquids, gases and steam. The control valve 1 is moved by an actuator and a valve positioner or guide 2. It is to be noted that the structure and function of the control valve 1 and the associated guide and the actuator 2 are not relevant to the invention. Relevant to the invention is only that the unit 2 produces measurement information $\alpha_m$ about the opening of the valve and may be controlled by the signal $\alpha_c$ for controlling the valve opening. At a suitable point after the valve 1 in the flow process to be controlled, there is connected a flow indicator (FI) 4 producing the measured flow value $Q_m$. The flow indicator 4 is preferably a flow indicator that already exists in the process, or it may be installed in the process for the purpose of the invention. The flow indicator 4 is preferably located after the valve 1, but it may also be placed at a suitable point of the flow process before the valve 1.

A controller block 3 represents generally a control function implementing the flow control according to an embodiment of the present invention and a unit implementing the control function. The controller 3 may be implemented by any unit with a sufficient computing capacity, which may be remote from the control valve 1 and its control and actuator apparatus 2 or which is co-located with the control valve 1 and the control and actuator apparatus 2 or integrated into these, as will be explained below.

Figure 2:
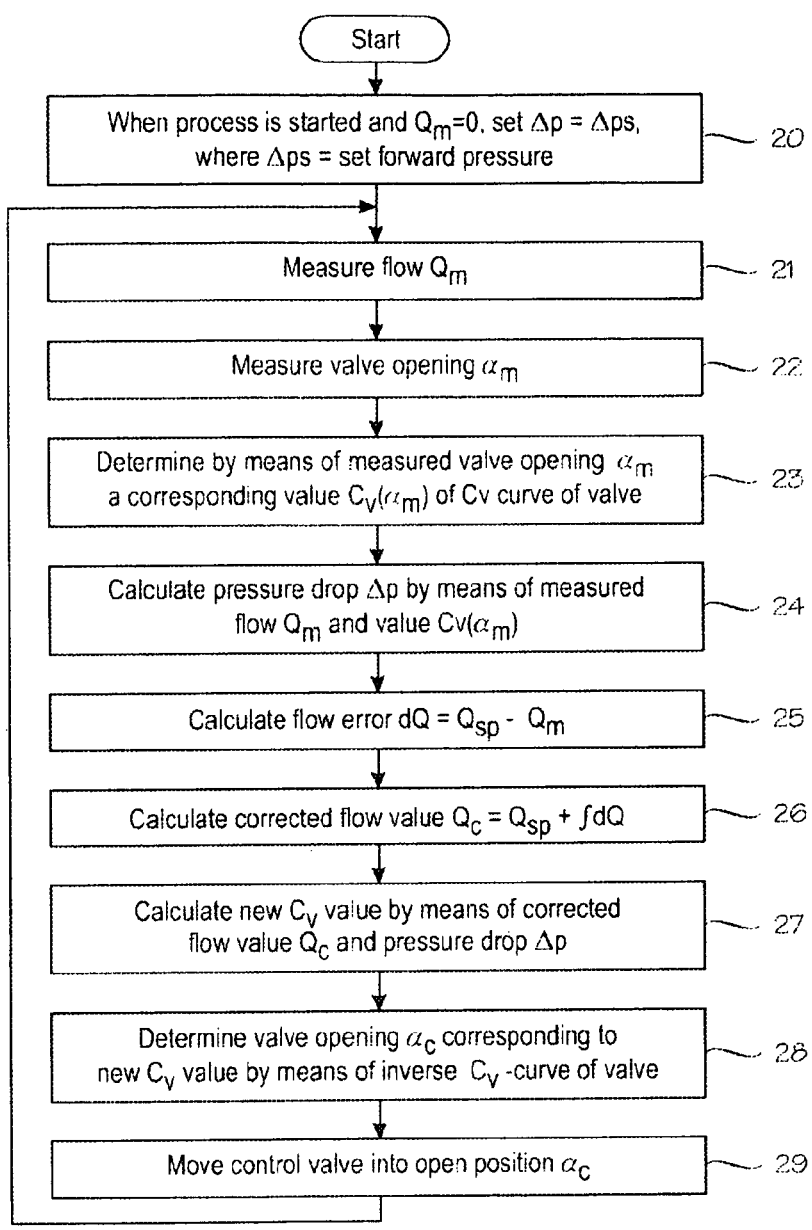
FIG. 2 is a flow diagram showing an exemplary control algorithm according to an embodiment of the invention.
Figure 6:
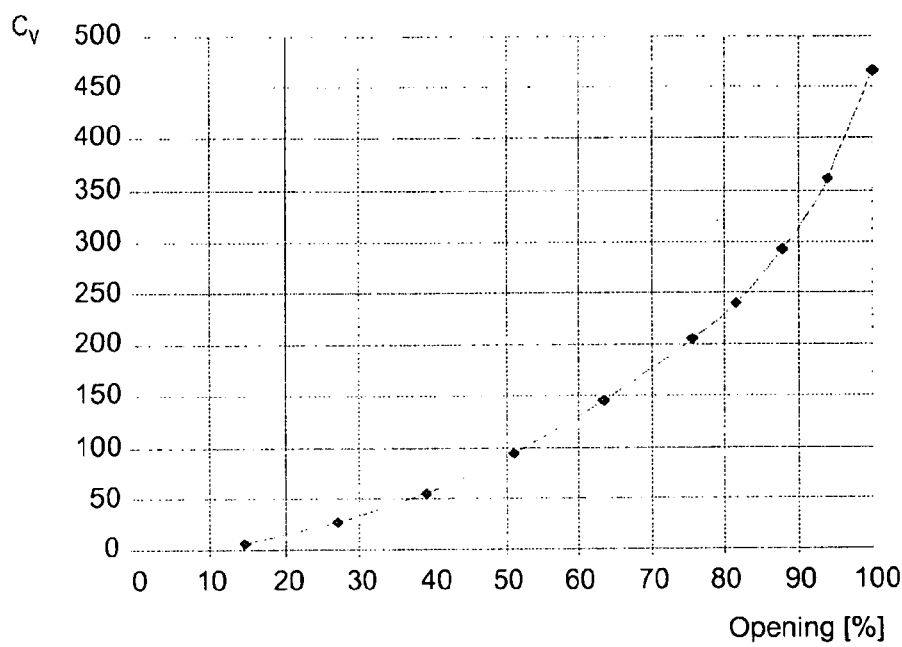
FIG. 6 is a graph showing an example of a $C_v$ curve of the control valve, i.e. the valve opening as a function of $C_v$.

How the control circuit of the type shown in FIG. 1 functions according to an embodiment of the invention is explained in the following by means of an example and with reference to FIG. 2. According to the principles of the invention, the controller 3 utilizes the precise information provided by the flow measurement on the material flow at a suitable point of the process 5. This measured flow $Q_m$ is obtained from the flow indicator 4, for instance (step 21 in FIG. 2). The controller 3 also receives a measured value $\alpha_m$ for opening the valve 1 from the control and actuator apparatus 2 of the control valve (step 22). The $C_v$ curve of the control valve 1 is also stored in the controller 3, e.g. in tabular form, in another type of data structure or in form of a mathematical function. FIG. 6 shows an example of the $C_v$ curve of the control valve, showing the $C_v$ value as an a function of the valve opening. The corresponding curve points $(\alpha, C_v)$ are presented in tabular form in table 1.

TABLE 1

| Cv | opening α (%) |
|---|---|
| 7 | 14.63 |
| 27 | 26.83 |
| 55 | 39.02 |
| 95 | 51.22 |
| 145 | 63.41 |
| 205 | 75.61 |
| 240 | 81.71 |
| 293 | 87.80 |
| 362 | 93.90 |
| 465 | 100.00 |

It is to be noted that only a small number of curve points are shown herein for the sake of clarity. In practice, a considerably higher number of points may be stored. By means of the measured valve opening $\alpha_m$, a corresponding value $C_v(\alpha_m)$ of the $C_v$ curve of the valve on the stored $C_v$ curve may be searched for (step 23). For instance, if the measured opening $\alpha_m$ is 52 percent, the corresponding $C_v(\alpha_m)$ value on the curve 6 is 96. After this, the pressure drop $\Delta p$ across the closure member of the control valve may be solved, e.g. for water, by means of the measured flow $Q_m$ and the value $C_v(\alpha_m)$ (step 24) on the basis of the flow equation (1) in the following manner:

$$\sqrt{\Delta p} = \frac{Q_m}{N * C_v(\alpha_m)} \qquad (2)$$

The controller 3 also receives the flow set point $Q_{sp}$ from the process controller, for instance, either directly or via the control and actuator apparatus 2. It is to be noted that herein the flow set point refers to any signal representing the desired flow. Now it is possible to calculate the difference or error dQ between the flow set point and the measured flow (step 25)

$$dQ = Q_{sp} - Q_m \qquad (3)$$

In an embodiment of the invention, the flow error is integrated and the integration result is added to the flow set point $Q_{sp}$ to obtain a corrected flow value, by which the valve opening may be controlled so that the error is compensated for (step 26)

$$Q_c = Q_{sp} + \int dQ \qquad (4)$$

After this, a new $C_v$ value may be calculated by means of the corrected flow value $Q_c$ and the pressure drop $\Delta p$ (step 27)

$$C_v = \frac{Q_c}{N * \sqrt{\Delta_p}} \qquad (5)$$

Figure 7:
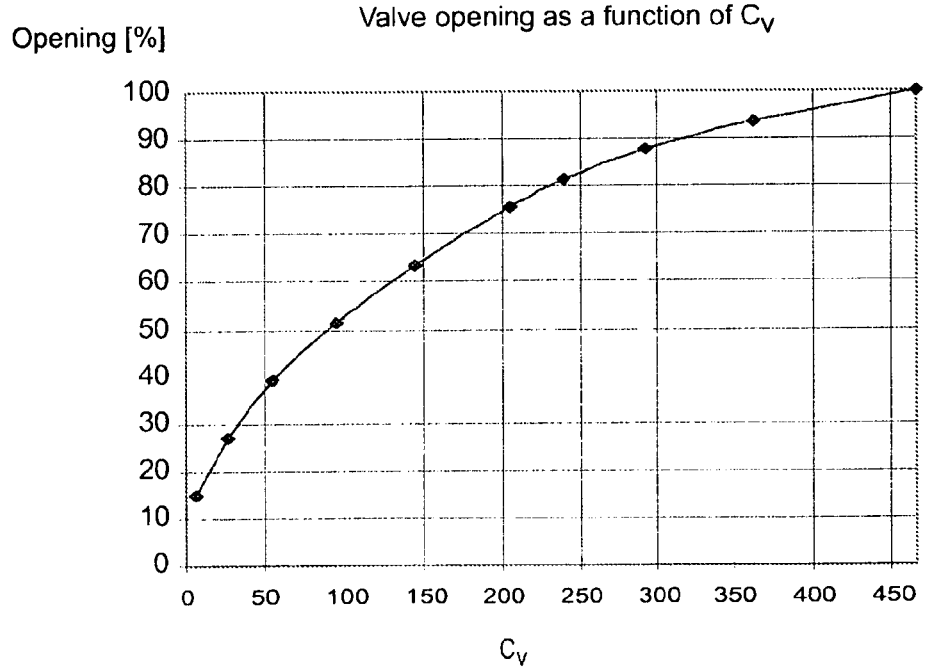
FIG. 7 is a graph showing an example of an inverse $C_v$ curve of the control valve, i.e. the valve opening as a function of $C_v$.

By using the inverse $C_v$ curve of the control valve, the valve opening $\alpha_c$ corresponding to the new $C_v$ value is then determined (step 28). An inverse $C_v$ curve of the valve refers here to a curve showing the valve opening as a function of the $C_v$ value. FIG. 7 shows the inverse $C_v$ curve of FIG. 6 as an example. For instance, if the corrected $C_v$ value is 250, the corresponding opening value is $\alpha_c = 82$. The inverse $C_v$ curve may be stored separately, or the opening corresponding to the $C_v$ value may be sought, for instance, from Table 1 or a corresponding data structure. After this, the controller 3 supplies the new opening value $\alpha_c$ to the control and actuator apparatus 2, which moves the control valve into a new open position (step 29). Then the control algorithm returns to step 21 to start the next control cycle.

When the process is started and the measured flow $Q_m=0$, the pressure drop $\Delta_p$ cannot yet be calculated but is set to a certain forward pressure drop $\Delta_{ds}$ predefined in the algorithm (step 20).

It is to be noted that said flow equation (1, 2) is valid for water at a certain temperature but that other flow equations known per se may also be used. For example, in the case of compressed material or a cavitating flow, in addition to Cv other flow dimensioning coefficients may also be taken into account. However, Cv information is always required in every application. For gas flows, information on the pressure level on the input side of the valve is preferably provided in order to access the information on the material flow.

Figure 8:
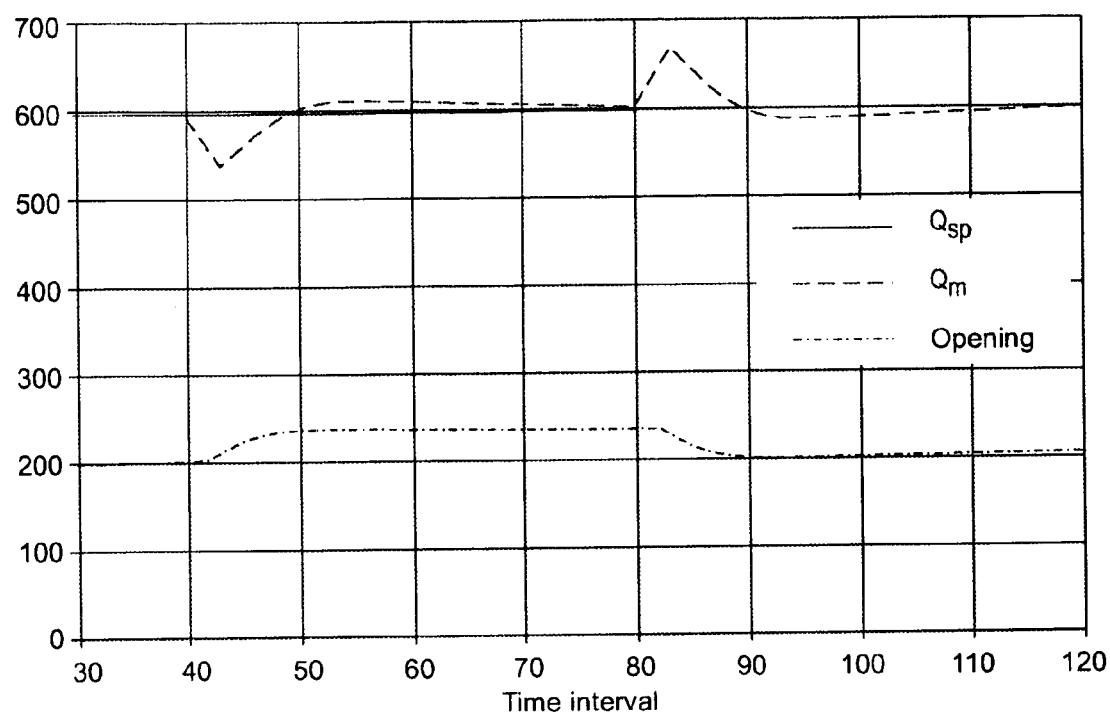
FIGS. 8 and 9 show simulation results 7 in a failure state and, accordingly, when the flow set point changes.

FIG. 8 shows a simulated situation, in which an inlet pressure disturbance occurs on the input side of the control valve 1, causing a drop in the measured flow $Q_m$, whereupon the error becomes higher with respect to the flow set point $Q_{sp}$. The control algorithm according to the invention reacts to this by increasing the opening of the control valve until the measured flow $Q_m$ is set back to the set point $Q_{sp}$. Later on at the time interval 80, the pressure on the input side returns to normal and the measured flow $Q_m$ starts to increase with respect to the flow set point $Q_{sp}$, because the control valve is previously adapted to the disturbance, i.e. the low inlet pressure. The control algorithm of the invention reacts to the change in the other direction of the flow error dQ by diminishing the opening of the control valve until the measured $Q_m$ is set to the set point $Q_{sp}$ again. The control delay is mainly affected by the integration time constant of the error dQ.

Figure 9:
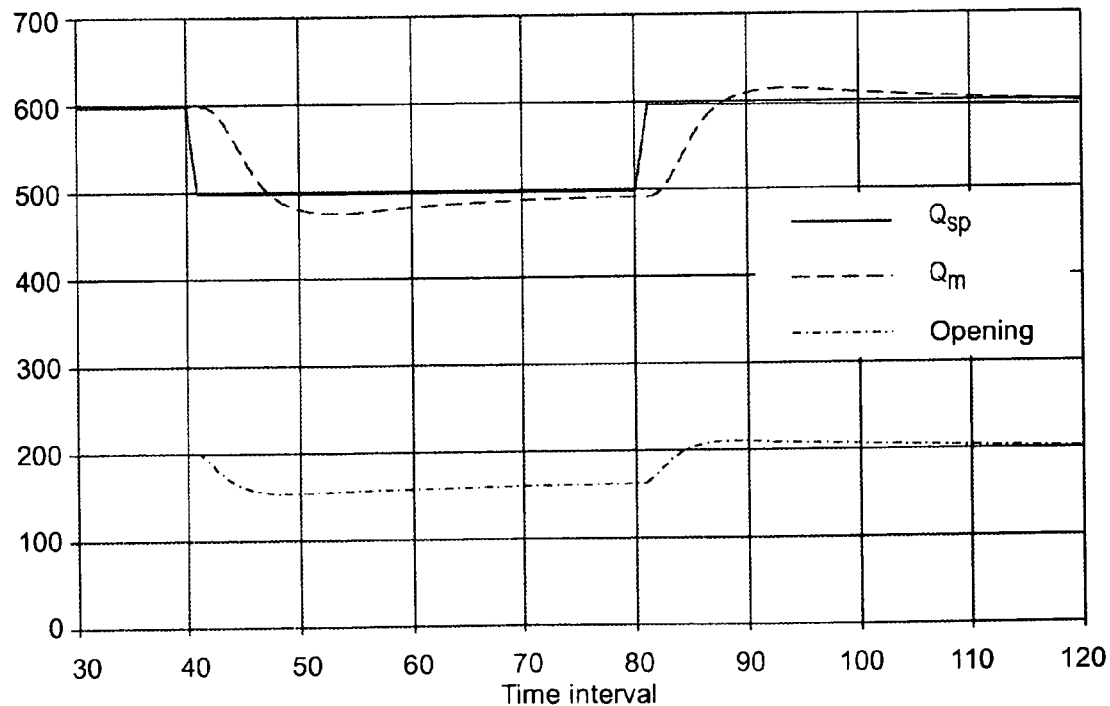

FIG. 9 shows a simulation of the situation where the flow set point is dropped step by step and returned again step by step back to its original value. After the set point $Q_{sp}$ drop, the error dQ is large, so the control algorithm of the invention reduces the opening of the control valve to a value that reduces the measured flow $Q_m$ to a new set point $Q_{sp}$. Accordingly, as the set point $Q_{sp}$ is increased step by step, the control algorithm of the invention gradually increases the opening of the control valve to a value, at which the measured flow $Q_m$ increases to the new set point $Q_{sp}$.

Figure 3:
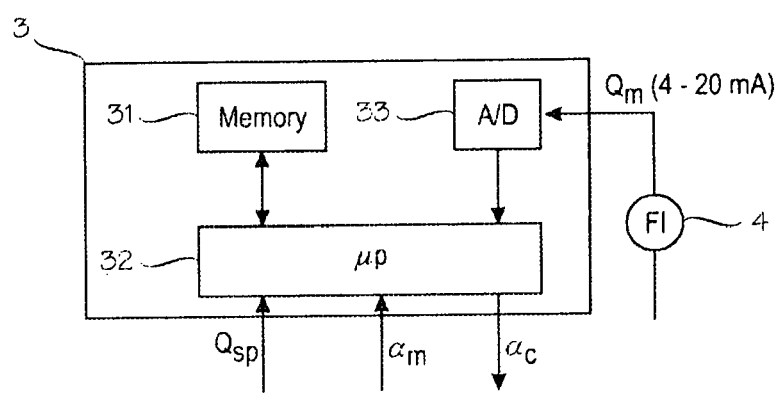
FIG. 3 is a block diagram showing an example of a controller to be placed in connection with a control valve.

As was stated above, the controller and control algorithm of the invention may be implemented in a variety of ways. FIG. 3 illustrates an example, in which the controller 3 is implemented locally so that it is connected or integrated into the control valve 21 and its actuator 2. The controller 3 may comprise, for instance, a microprocessor or other similar central processing unit 32, to which a memory 31 acting as a program and working memory is connected. The flow indicator 4 supplies a current signal (4 to 20 mA) which is proportional to the measured flow $Q_m$ and converted by an analog-to-digital converter 33 to digital form and then supplied to the microprocessor 32. As inputs, the flow set point $Q_{sp}$ and the measured opening $\alpha_m$ of the control valve are also received at the microprocessor 32. As an output, the microprocessor supplies the control value $\alpha_c$ for the opening of the control valve. These signals may be analog flow signals (4 to 20 mA), serial digital signals or other suitable analog or digital signals. After the start-up the microprocessor 32 performs, for example, the control algorithm according to FIG. 2. The solution of the type shown in FIG. 3 is advantageous when, for instance, the existing control valves are updated to function according to the invention or when a new control valve process environment is implemented, where measurement and control signals are transferred as current signals of 4 to 20 mA.

Figure 4:
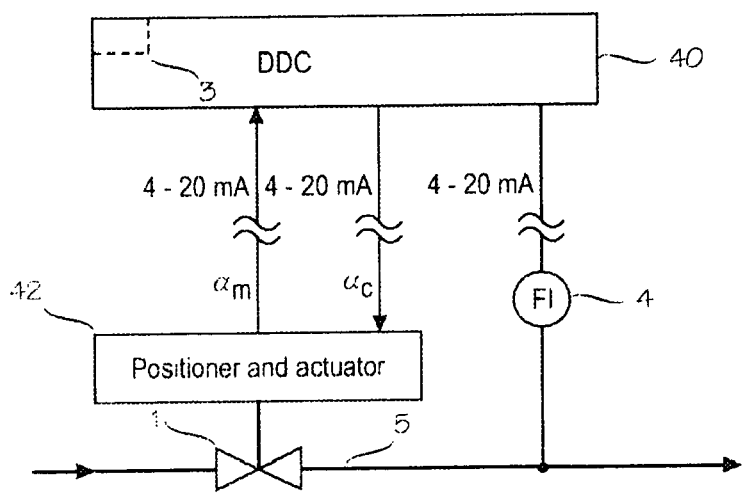
FIG. 4 is a block diagram showing as an example, how the controller is located in a process control computer in e.g. a DCS type of control system.

FIG. 4 shows another example configuration, in which the controller 3 according to the invention is located in a centralized process control computer 40, to which the measured flow $Q_m$ is supplied as a current signal of 4 to 20 mA from the flow indicator 4. Accordingly, the measured valve opening $\alpha_m$ is also supplied from the control and actuator apparatus 42 of the control valve 1 as a current signal of 4 to 20 mA to the control computer 40. The computer 40 supplies the value $\alpha_c$ for controlling the opening as a current signal of 4 to 20 mA to the control and actuator apparatus 42. The control algorithm 3 performs the control algorithm of FIG. 2, for instance.

Figure 5:
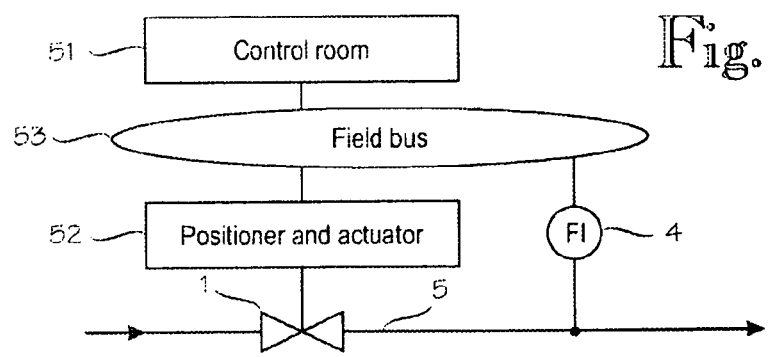
FIG. 5 is a block diagram showing an example of a control system which is implemented with fieldbus technology and to which embodiments of the invention may be applied.

As another example, FIG. 5 shows a distributed control system, in which the flow indicator 4 and the control and actuator apparatus 52 of the control valve are intelligent field devices, which are in connection with one another and e.g. a control room computer 51 via a field bus 53. Intelligent field devices have data processing and computing capacities, which may be used for performing the control algorithm of the invention. In this case, the controller according to an embodiment of the invention may be implemented in an intelligent field device 52, an intelligent flow indicator 4 or some other intelligent field device of the distributed control system. Thus, the set point $Q_{sp}$, the measured flow $Q_m$, the measured valve opening $\alpha_m$ and the control value $\alpha_c$ for the valve opening must be transferred between the controller 3, the flow indicator 4 and the control and actuator apparatus 52 as shown above. A problem with solutions of the type shown in FIGS. 4 and 5 located remote from the valve controller 3 may be an increased control delay, which may impair the control result.

The description and the related figures are only intended to illustrate the principles of the present invention by means of examples. Various alternative embodiments, variations and changes are obvious to a person skilled in the art on the basis of this description. The present invention is not intended to be limited to the examples described herein but the invention may vary within the scope and spirit of the appended claims.

The invention claimed is:

1. A method for controlling a flow control valve, the method comprising:
    measuring a present opening of the valve;
    measuring a flow through the present opening of the valve;
    determining a $C_v$ value of the valve, using said present opening of the valve, on a $C_v$ curve of the valve, wherein the $C_v$ value is a flow coefficient value and the $C_v$ curve describes $C_v$ values as a function of valve openings;
    calculating a pressure drop across the valve by means of the measured flow and the determine $C_v$ value;
    calculating a flow deviation as a difference between a desired flow set point and the measured flow;
    integrating said flow deviation;
    calculating a corrected flow set point by adding the integrated flow deviation to the desired flow set point;
    calculating a new $C_v$ value of the valve by means of the corrected flow set point and the calculated pressure drop;
    determining a new valve opening, using said new $C_v$ value of the valve, on an inverse $C_v$ curve of the valve, wherein the inverse $C_v$ curve describes valve openings as a function of $C_v$ values;
    moving the valve to a new opening position in response to the determined new valve opening; and
    continuing said determining of a new valve opening and said moving the valve to a new opening position until the measured flow is set to the desired flow set point.

2. The method as claimed in claim 1, further comprising prestoring values of the $C_v$ curve of the valve and also a value of the inverse $C_v$ curve in a memory.

3. The method as claimed in claim 1, further comprising prestoring values of the inverse $C_v$ curve in a memory.

4. A control system for a flow control valve, comprising:
a controller configured to receive a measurement of a present opening of the valve;
a flow indicator configured to measure a flow through the present opening of the valve;
the controller being configured to determine a $C_v$ value of the valve, using said present opening of the valve, on a $C_v$ curve of the valve, wherein the $C_v$ value is a flow coefficient value and the $C_v$ curve describes $C_v$ values as a function of valve openings;
the controller being configured to calculate a pressure drop across the valve by means of the measured flow and the determined $C_v$ value;
the controller being configured to calculate a flow deviation as a difference between a desired flow set point and the measured flow;
the controller being configured to integrate said flow deviation;
the controller being configured to calculate a corrected flow set point by adding the integrated flow deviation to the desired flow set point;
the controller being configured to calculate a new $C_v$ value of the valve by means of the corrected flow set point and the calculated pressure drop;
the controller being configured to determine a new valve opening, using said new $C_v$ value of the valve, on an inverse $C_v$ curve of the valve, wherein the inverse $C_v$ curve describes valve openings as a function of $C_v$ values;
the controller being configured to move the valve to a new opening position in response to the determined new valve opening; and
the controller being configured to continue said determining of a new valve opening and said moving the valve to a new opening position until the measured flow is set to the desired flow set point.

5. The system as claimed in claim 4, wherein the controller comprises a memory configured to prestore values of the $C_v$ curve of the valve.

6. The system as claimed in claim 4, wherein the controller is implemented in one of the following apparatuses: a control valve guide, a valve positioner, an intelligent field device, a controller of a distributed control system, a process control computer, or a control room computer.

7. The system as claimed in claim 4, wherein the controller further comprises a memory configured to prestore values of the inverse $C_v$ curve.

8. A controller for controlling a flow control valve, comprising:
the controller being configured to receive a measurement of a present opening of the valve;
the controller being configured to receive a measurement of a flow through the present opening of the valve;
the controller being configured to determine a $C_v$ value of the valve, using said present opening of the valve, on a $C_v$ curve of the valve, wherein the $C_v$ value is a flow coefficient value and the $C_v$ curve describes $C_v$ values as a function of valve openings;
the controller being configured to calculate a pressure drop across the valve by means of the measurement of the flow and the determined $C_v$ value;
the controller being configured to calculate a flow deviation as a difference between a desired flow set point and the measurement of the flow;
the controller being configured to integrate said flow deviation;
the controller being configured to calculate a corrected flow set point by adding the integrated flow deviation to the desired flow set point;
the controller being configured to calculate a new $C_v$ value of the valve by means of the corrected flow set point and the calculated pressure drop;
the controller being configured to determine a new valve opening, using said new $C_v$ value of the valve, on an inverse $C_v$ curve of the valve, wherein the inverse $C_v$ curve describes valve openings as a function of $C_v$ values;
the controller being configured to move the valve to a new opening position in response to the determined new valve opening; and
the controller being configured to continue said determining of a new valve opening and said moving the valve to a new opening position until the measurement of the flow is set to the desired flow set point.

9. The controller as claimed in claim 8, wherein the controller comprises a memory configured to prestore values of the $C_v$ curve of the valve.

10. The controller as claimed in claim 8, wherein the controller comprises a programmable processor or a computer and a program code to be executed in the computer or the processor.

11. The controller as claimed in claim 8, wherein the controller further comprises a memory configured to prestore values of the inverse $C_v$ curve.

12. A non-transitory computer-readable storage medium having computer-executable components that perform:
receiving a measurement of a present opening of a valve;
receiving a measurement of a flow through the present opening of the valve;
determining a $C_v$ value of the valve, using said present opening of the valve, on a $C_v$ curve of the valve, wherein the $C_v$ value is a flow coefficient value and the $C_v$ curve describes $C_v$ values as a function of valve openings;
calculating a pressure drop across the valve by means of the measurement of the flow and the determined $C_v$ value;
calculating a flow deviation as a difference between a desired flow set point and the measurement of the flow;
integrating said flow deviation;
calculating a corrected flow set point by adding the integrated flow deviation to the desired flow set point;
calculating a new $C_v$ value of the valve by means of the corrected flow set point and the calculated pressure drop;
determining a new valve opening, using said new $C_v$ value of the valve, on an inverse $C_v$ curve of the valve, wherein the inverse $C_v$ curve describes valve openings as a function of $C_v$ values;
moving the valve to a new opening position in response to the determined new valve opening; and
continuing said determining of a new valve opening and said moving the valve to a new opening position until the measurement of the flow is set to the desired flow set point.

13. An apparatus comprising a processor and a memory storing executable instructions configuring the processor to perform:
receiving a measurement of a present opening of a valve;
receiving a measurement of a flow through the present opening of the valve;

determining a $C_v$ value of the valve, using said present opening of the valve, on a $C_v$ curve of the valve, wherein the $C_v$ value is a flow coefficient value and the $C_v$ curve describes $C_v$ values as a function of valve openings;

calculating a pressure drop across the valve by means of the measurement of the flow and the determined $C_v$ value;

calculating a flow deviation as a difference between a desired flow set point and the measurement of the flow;

integrating said flow deviation;

calculating a corrected flow set point by adding the integrated flow deviation to the desired flow set point;

calculating a new $C_v$ value of the valve by means of the corrected flow set point and the calculated pressure drop;

determining a new valve opening, using said new $C_v$ value of the valve, on an inverse $C_v$ curve of the valve, wherein the inverse $C_v$ curve describes valve openings as a function of $C_v$ values;

moving the valve to a new opening position in response to the determined new valve opening; and continuing said determining of a new valve opening and said moving the valve to a new opening position until the measurement of the flow is set to the desired flow set point.

* * * * *